US008180762B2

(12) United States Patent
Steinbach et al.

(10) Patent No.: US 8,180,762 B2
(45) Date of Patent: May 15, 2012

(54) DATABASE TUNING METHODS

(75) Inventors: Thorsten Steinbach, Boeblingen (DE);
Michael Reichert, Shoenaich (DE);
Holger Karn, Aidlingen (DE); **Namik
Hrle, Boeblingen (DE); Norbert Heck**,
Hildrizhausen (DE)

(73) Assignee: **International Business Machines
Corporation**, Armonk, NY (US)

( * ) Notice: Subject to any disclaimer, the term of this patent is extended or adjusted under 35 U.S.C. 154(b) by 742 days.

(21) Appl. No.: 11/467,065

(22) Filed: Aug. 24, 2006

(65) Prior Publication Data

US 2007/0136383 A1    Jun. 14, 2007

(30) Foreign Application Priority Data

Dec. 13, 2005   (EP) ..................... 05112036

(51) Int. Cl.
*G06F 7/00*   (2006.01)
(52) U.S. Cl. ......... 707/713; 707/679; 707/683; 707/684
(58) Field of Classification Search ................ 707/1, 2, 707/3, 200, 203, 999.2, 713, 679, 683, 684
See application file for complete search history.

(56) References Cited

U.S. PATENT DOCUMENTS

| 6,871,163 | B2 | 3/2005 | Hiller et al. | |
|---|---|---|---|---|
| 2003/0182276 | A1* | 9/2003 | Bossman et al. | 707/3 |
| 2005/0055385 | A1* | 3/2005 | Sinha et al. | 707/203 |
| 2005/0086195 | A1* | 4/2005 | Tan et al. | 707/1 |
| 2005/0086246 | A1* | 4/2005 | Wood et al. | 707/101 |
| 2005/0097091 | A1* | 5/2005 | Ramacher et al. | 707/3 |
| 2005/0256829 | A1* | 11/2005 | Yang et al. | 707/1 |
| 2006/0271504 | A1* | 11/2006 | Anderson et al. | 707/2 |
| 2006/0277123 | A1* | 12/2006 | Kennedy et al. | 705/35 |

OTHER PUBLICATIONS

Budi Darmawam et al.; "Database Performance Tuning on AIX"; Nov. 11, 2002; IBM Redbooks; http://staff.ustc.edu.cn/~lywang/handbook/IBM%20Aix/Database_tuning_AIX.pdf.*
Softtree Technologies Inc., "DB Tuning Expert", Copyright 1999-2000, 6 pages, retrieved on Aug. 22, 2006 from: http://www.softtreetech.com/dbtools/.
Oracle Corporation, "Oracle Enterprise Manager 10g Oracle Tuning Pack", Oct. 2005, 5 pages, retrieved on Aug. 22, 2006 from: http://www.oracle.com/technology/products/oem/pdf/ds_db_tp.pdf.

* cited by examiner

*Primary Examiner* — Dennis Truong
(74) *Attorney, Agent, or Firm* — Mollborn Patents, Inc.; Fredrik Mollborn

(57) ABSTRACT

A method for tuning a database system is disclosed. A tuning strategy is received comprising a first procedure to determine a suggested tuning action, and a second procedure to measure performance of the database system. The suggested tuning action is determined and pre-action performance measured according to the respective procedures. Undo information that indicates how to undo the database system state change of the suggested tuning action is recorded in a database system state history. After executing the suggested tuning action, post-action database system performance is measured according to the second procedure. When the post-action performance is lower than the pre-action performance, the database system state change is undone using the undo information. Embodiments enabling to create new tuning strategies, downloading existing tuning strategies, sharing own tuning strategies and changing existing tuning strategies are disclosed as well.

14 Claims, 3 Drawing Sheets

DATABASE TUNING METHODS

FIELD OF THE INVENTION

The present invention relates to the field of database systems and methods, and more particularly without limitation to the field of performance tuning of database systems.

BACKGROUND

The evolution of information technology over the last decades has led to the creation of increasingly powerful computer systems, making individuals and businesses more productive by automating key tasks and processes. The benefit of automation, however, has come at a price of increasing complexity of the computer systems themselves, which have developed from single machines to modular systems and networks of subsystems. At the core of many of the most complex computer systems are database systems. Many aspects of the environment as part of which a database system performs its tasks cannot be anticipated by the architects of the database system. They have instead to be dealt with by database run-time tuning considering a dynamically changing workload and surrounding software and hardware specifics.

Tuning complex database systems can be difficult and time-consuming. For example, some database systems such as DB2 may have hundreds of configuration parameters that must be set correctly for the system to perform optimally. In addition, the actual physical data model in the database provides many different options to optimize database statement executions. Also, client applications accessing the database can be subject to a set of potential tuning measures with regard to their database access. Skilled database technology professionals are required to configure the system, judging performance based on possibly thousands of performance indicators of the system, interpreting them and taking corrective measures.

The Oracle Tuning Pack (http://www.oracle.com/technology/products/oem/pdf/TP_9iR2_FO.pdf) is a set of applications that provides automated database analysis and tuning. The Tuning Pack identifies opportunities to increase database performance by tuning database instance settings, indexes, SQL, and space usage. Proactive database tuning with the Tuning Pack can increase system responsiveness and reduce the cost of database maintenance.

DB Tuning Expert (http://www.softtreetech.com/dbtools/) is a tool for those who are responsible for the operation, maintenance, and performance of an Oracle database server, helping to identify database performance problems. With a few mouse clicks, database performance and organization diagnostic tests can be run and a comprehensive report provided on the existing performance problems along with expert recommendations for solving found problems and avoiding them in the future.

U.S. Pat. No. 6,871,163 discloses methods and systems for behavior-based adaptation of computer systems. Rules are received that specify data of the computer system to be recorded and data of the computer system to be summarized for evaluation. The method includes recording data as specified by the rules, and performing an evaluation of the data recorded. The evaluation includes identifying a change to the computer system and determining whether the change will increase the efficiency of the computer system. The method includes, when the evaluation indicates that the change will increase the efficiency of the computer system, proposing the change.

A common trait frequently found in state of the art technology is that tuning logic is built into the product and cannot be deployed separately. Thus enhancing the tuning solution with third party or customer tuning knowledge is very difficult or even impossible.

SUMMARY OF THE INVENTION

In accordance with the present invention there is provided a method for tuning a database system. The method comprises receiving a tuning strategy, which specifies a first procedure to determine a tuning action involving a database system state change, and a second procedure to measure database system performance.

The suggested tuning action is determined according to the first procedure, and pre-action database system performance measured according to the second procedure. Undo information that indicates how to undo the database system state change of the suggested tuning action is recorded in a database system state history.

After executing the suggested tuning action, post-action database system performance is measured according to the second procedure. When the post-action database system performance is lower than the pre-action database system performance, the database system state change of the tuning action are undone using the undo information from the database state change history.

The present invention enables tuning the database system according to a formalized tuning strategy, allowing for flexibility with regard from where and when the tuning strategy is received. In this way, the invention enables making expert knowledge from different sources available for tuning the database system. The tuning process according to the tuning strategy can be performed automatically, and no specialized knowledge of tuning strategies is required by an administrator of the database system.

For example, the tuning strategy can be received from the database system's manufacturer at the time of delivery of the database system, but also at a later time, when the manufacturer has developed an improved tuning strategy. In the form of the tuning strategy, new advances made and new insight gained by the manufacturer after the delivery of the database system can be transferred to a customer without delay. Another source from where the tuning strategy can be received is experienced administrators of similar database systems, for example, within an organization that runs several database systems similar to each other, such as development, test, and production systems of the same kind, or systems of the same kind operated for different customers by an application services provider. A further source from where the tuning strategy can be received is vendors of application software for the database system, such as a particular database application. In this way a customer of a vendor of application software can tune the database system according to a specialized tuning strategy that is custom-made for the particular kind of software used on to of the database system. Yet another source from where the tuning strategy can be received is independent (i.e. third party) vendors and public exchanges of tuning strategies, for example a tuning strategy market place.

The strategy according to which the database system is tuned can be verified as part of the tuning process. Because the performance of the database system is measured before, and a second time after the tuning action, comparing the results of both measurements provides a criterion as to whether the tuning strategy has been successful in increasing the performance of the database system. If the performance is found to have decreased, the database system is restored to its state before the tuning action, based on the undo information that has been saved in the database system state history, thereby reverting negative effects of an unsuccessful tuning strategy. This is advantageous, for example, if the tuning strategy was received from an administrator of another similar but not identical database system. If due to the similarity the tuning strategy is successful in increasing the performance of the database system, the database retains the system state to which it was set according to the tuning strategy. If, on the contrary, due to remaining dissimilarities the tuning strategy is not successful in increasing the performance of the database system, the previous state of the database system is restored. In neither case the performance of the database system is decreased as result of the tuning process.

In accordance with one embodiment of the invention, the database system state change is selected from the group consisting of modification of a database configuration parameter, creation of a database table index, and removal of a database table index. For example, when the database system state change is a modification of a configuration parameter, the first procedure specifies how to determine a new value for the configuration parameter, and the undo information comprises the old value of the same configuration parameter. Likewise, when the database system state change is a creation of a database table index, the first procedure specifies, for example, how to determine for which variable of which database table an index is to be created.

In accordance with one embodiment of the invention, the first procedure comprises collecting query language statements processed by the database system. The statements collected are then analyzed for the determining of the suggested tuning action. This embodiment is advantageous because, for example, when determining whether to create an index for a large database table, the decision can be based on an analysis of all queries referencing the database table during a predetermined time interval, thus enabling to tune the database according to characteristics of its workload. For example, the strategy can lead to the decision to create the index if most of the queries analyzed access only a small amount of data from the database table, while not creating it if most queries access large amounts of data from the database table.

In accordance with one embodiment, the method comprises waiting for a predetermined time interval after executing the suggested tuning action. This embodiment enables consideration of longer-term effects that the tuning action has on the performance of the database system. In particular, the embodiment enables enhancing the reliability of verifying an increase in performance because the effect of statistical fluctuations on a measured database performance indicator are reduced if the performance indicator is determined from data accumulated during an extended time interval.

In accordance with one embodiment, there is a plurality of tuning actions determined for the database system according to the first procedure, each of the tuning actions involving a respective one of a plurality of database system state changes. The undo information indicates how to undo each of the plurality of database system state changes, and, when the post-action database system performance is lower than the pre-action database system performance, each of the plurality of database system state changes is undone using the undo information. This embodiment enables the tuning of a complex database system that requires tuning hundreds or more of configuration parameters and offers many different alternatives how to set up a physical data model. Such alternatives include: creation of indexes, materialized query tables, updating statistics, reorganizations. For example, two configuration parameters can be set to new values at the same time, or two indexes created simultaneously in the data model. This enables tuning of the database system according to a tuning strategy that requires simultaneous changes.

In accordance with one embodiment, the tuning strategy is stored in a data object, the database system comprising a tuning strategy interpreter to interpret the data object. This embodiment facilitates the storing and exchanging of tuning strategies. The data object can be saved as a data file or database record in non-volatile memory and can be exchanged over a computer network. Using the interpreter to interpret the data object, the database system is enabled to tune itself according to the tuning strategy stored in the data object. Preferably, the data object is in a format independent of the platform of the database system, in particular in Extensible Markup Language (XML) format. The XML format facilitates the creation, validation, exchange, and execution of tuning strategies stored in such a format due to a large number of proven tools and libraries.

In accordance with one embodiment, the tuning strategy is received from a remote repository of tuning strategies. This embodiment enables rapid distribution of tuning strategies in an automated and formalized manner. For example, the remote repository can be operated on the Internet by the manufacturer of the database system, by an organization using the database system on an internal network of the organization, or by third parties such as independent providers of tuning strategies. The remote repository furthermore enables using secure protocols for uploading and downloading tuning strategies, thus providing certainty about the source and trustworthiness of the tuning strategy received. This principle facilitates building database performance tuning communities by providing a formalized way of exchanging tuning knowledge. The remote repository can provide all means of a typical online community, such as lists of the most popular tuning strategies or comments on tuning strategies that lead to a refinement of the tuning strategies over time. An established community together with the database systems that have deployed the technology of this invention are thus enabled to function as ecosystems of database system tuning techniques.

In accordance with one embodiment, the database system comprises a user interface having a stopping element for stopping during one of the steps of the tuning process, a disclosure element for disclosing the one of the steps via the user interface, and a continuation element for continuing execution of the one of the steps when acknowledgment of the one of the steps is received via the user interface. This embodiment enables an administrator of the database system to examine the steps before executing them, thereby observing and controlling the tuning process. An administrator, who has doubts about the trustworthiness or quality of the tuning strategy, is provided with information on which to base a judgment, and with the opportunity to withhold acknowledgment for execution of an unwanted step. Through examining the one of the steps, a less experienced administrator can acquire new knowledge about tuning strategies. In this way, the tuning strategy functions as a medium for transfer of database tuning knowledge from more experienced to less experienced administrators. Preferably, the user interface further comprises means for modifying the steps before continuing execution, enabling an administrator to enhance the tuning strategy based on past experience or additional knowledge about peculiar aspects of the database system.

In accordance with one embodiment, the method comprises receiving a list of tuning strategies and repeating the method for each tuning strategy in the list. This embodiment enables automatically configuring the database system according to more than one tuning strategy, following sequentially through the tuning strategies given by the list. Because the list can potentially hold tuning strategies from a variety of different sources, the embodiment enables bringing together database expert knowledge of diverse origin into a unified, formally controlled tuning process.

In accordance with one embodiment, once the end of the list is reached and all tuning strategies of the list have been processed, the method proceeds to the beginning of the list, continuing the repeating with the first tuning strategy of the list of tuning strategies. This embodiment enables to re-tune the database system in response to any changes that have occurred since the last time the database system was tuned according to the first tuning strategy of the list. In the general case that external or internal conditions such as the load on the database system, the database size or the amount of resources available to the database system are variable over time, the embodiment enables to realize an ongoing, dynamic tuning process that adjusts the database system in response to the variable conditions.

In accordance with one embodiment, a tuning strategy in the list is disabled when the second procedure evaluates a lower performance compared to before the tuning action of the first process. This embodiment makes it possible to avoid repeating configuring according to a tuning strategy if past experience has shown that changing the database system state according to this tuning strategy leads to a decrease in performance of the database system. A tuning strategy that does not deliver the intended result when applied to the database system in this way is recognized and disabled. The embodiment therefore enables automatically optimizing the tuning process itself.

In accordance with one embodiment, the method comprises determining whether or not there is a suggested tuning action according to the first procedure of the current tuning strategy, and proceeding to the next tuning strategy from the list when the first procedure of the current tuning strategy does not have a suggested tuning action. This embodiment enables making the tuning process particularly efficient because execution time is saved by immediately proceeding to the next strategy specification from the list.

In accordance with one embodiment, the database system state history is analyzed for a non-converging oscillation of an oscillating database system state, for example a repeated increase and decrease of a configuration parameter, or a repeated creation and removal of an index. When a non-converging oscillation is detected, one of the tuning strategies from the list according to which the oscillating database system state was changed during the non-converging oscillation is disabled. This embodiment serves to avoid conflicts between mutually contradicting tuning strategies.

In accordance with one embodiment, the list of tuning strategies further comprises at least one notification strategy, which specifies a procedure to generate a notification to an administrator of the database system. An example is a notification verbally informing the administrator that the database system resources are exhausted with regard to the workload sent to the database system.

Another example is a notification that identifies the most resource consuming database applications or statements. This embodiment enables the method to formally handle tuning strategies that require actions that cannot be performed automatically. Furthermore, it enables to formally handle tuning strategies that require actions for which a dedicated approval of a human administrator is desired because they are irreversible or deemed critical for other reasons.

In accordance with one embodiment, the method further comprises creating an additional tuning strategy in the list of tuning strategies, and editing the additional tuning strategy through a strategy editor interface of the database system. For example, the additional tuning strategy can be created by duplicating an existing tuning strategy, or by starting from a substantially empty strategy template. This embodiment enables an administrator to extend the repertory of tuning strategies in the list with additional strategies representing particular tuning knowledge of the administrator. Furthermore, the administrator is enabled to create strategies that provide for particularities of the database system and its environment not covered by any tuning strategies available from other sources.

In accordance with one embodiment, the additional strategy is uploaded to a remote repository of tuning strategies. In this way, an administrator is enabled to share newly designed or improved strategies with a wider audience of database administrators.

In accordance with the present invention there are furthermore provided a database performance tuning system for tuning a monitored database system, and a computer program product comprising computer executable instructions for performing the method provided by the invention.

BRIEF DESCRIPTION OF THE DRAWINGS

Preferred embodiments of the invention will be described in greater detail by way of example with reference to the drawings in which.

DETAILED DESCRIPTION

Figure 1:
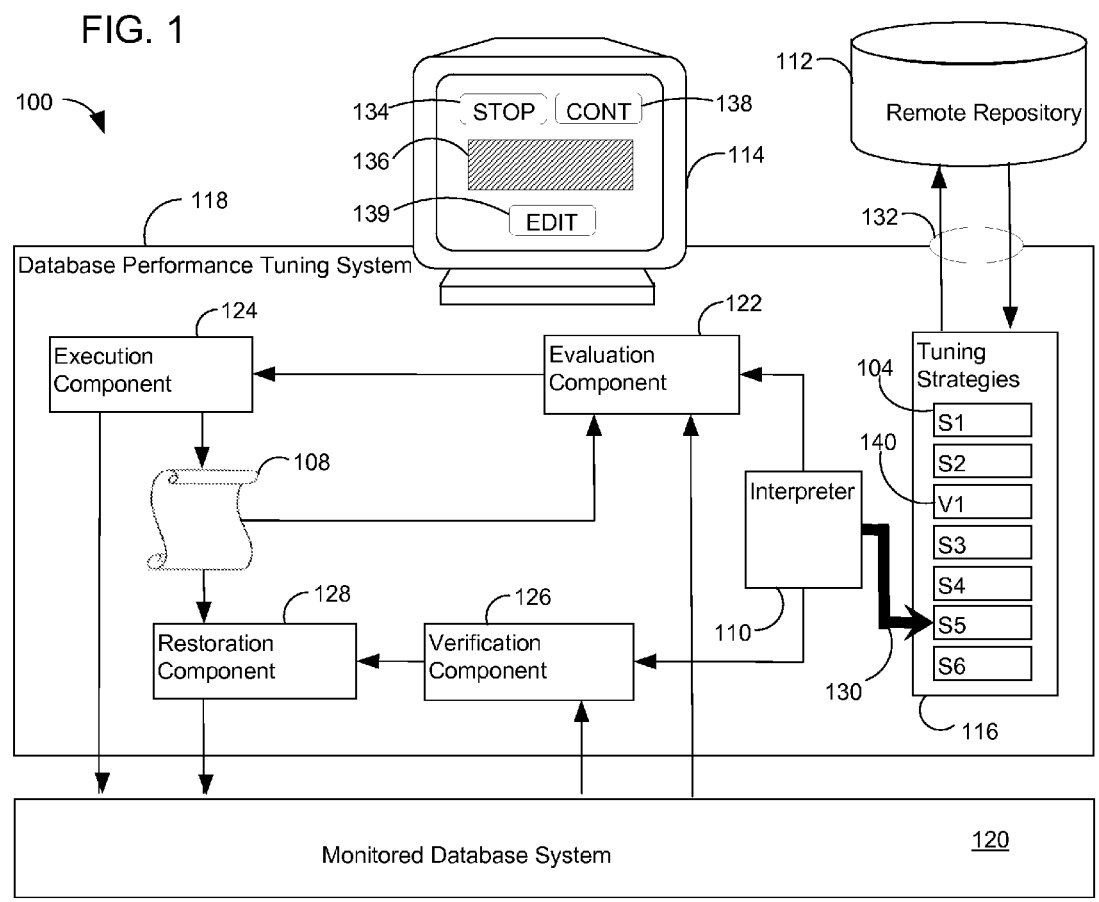
FIG. 1 is a block diagram of a database system in accordance with one embodiment of the invention.

FIG. 1 is a block diagram of a database system 100 implementing a method in accordance with one embodiment of the invention. The database system 100 comprises a database performance tuning system 118 for tuning a monitored database system 120. Examples of a monitored system include a database server, such as DB2 or Oracle.

The database performance tuning system 118 and the monitored database system 120 can be implemented as software applications running on shared hardware of the database system 100. However, effects of the load of executing the database performance tuning system 118 that complicate judging the performance of the monitored database system 120 can be minimized by implementing the database performance tuning system 118 and the monitored system 120 as separate hardware systems communicating via a computer network.

The database performance tuning system 118 comprises a list 116 of one or more tuning strategies 104, each specifying how to evaluate the need for and determine a tuning action, with the goal of increasing the performance of the monitored database system 120. In addition each of the tuning strategies 104 comprises a procedure for measuring the performance of the database system according to results of which to judge whether the performance of the monitored database system 120 has increased. The criterion of whether an increase or decrease in performance has occurred is therefore defined independently by each tuning strategy. The list 116 can furthermore comprise notification tuning strategies 140, each specifying generating a notification to an administrator of the database system 100. The notification can for example suggest an action to be taken manually by the administrator. Generating notifications can furthermore be part of any of the tuning strategies 104.

Preferably, the individual tuning strategies 104 in the list 116 are data objects that encode the procedures in a specialized workflow language that can be modeled for example based on the Extensible Markup Language (XML). The data objects can be downloaded from and uploaded to a remote repository 112 of tuning strategies, either automatically or semi-automatically, controlled by an administrator of the database system via a user interface 114. The remote repository 112 can for example be operated by the organization using the database performance tuning system, by the manufacturer of the database performance tuning system, the manufacturer of the monitored database system, a commercial service provider, or by independent exchanges of tuning strategies. Several remote repositories 112 can exist, to which the database performance tuning system 118 connects sequentially or simultaneously. The data objects can be digitally signed by a trusted authority such as the manufacturer of the database system 100, allowing verifying the trustworthiness of data objects that were downloaded from the remote repository 112 before adding them to the list 116 of tuning strategies 104.

The database performance tuning system 118 comprises an interpreter 110 for interpreting the workflow language of the data objects and passing corresponding instructions to an evaluation component 122 and a verification component 126 of the database performance tuning system. Both the evaluation component 122 and the verification component 126 are able to gather data from the monitored database system 120 as indicated by arrows pointing from the monitored database system 120 to the respective components. Data gathered can furthermore include historical data on past performance of the monitored database system 120, maintained by the performance tuning system 118 in a suitable storage location. The evaluation component 122 is furthermore able to retrieve information from a database system state history 108 in which all changes to a database system are recorded together with the time of the change and the tuning strategy that was responsible for the change. The evaluation component 122 is connected to an execution component 124, through which it is able to make changes to the monitored database system. The verification component 126 is connected to a restoration component 128, through which is able to revert changes made to the database system relying on information retrieved from the database system state history 108.

In operation, one of the tuning strategies 104 is singled out as current tuning strategy from the list 116 of tuning strategies by a pointer 130. The interpreter 110 interprets the workflow language of the current tuning strategy, passing instructions first to the evaluation component 122. According to the instructions, the evaluation component 122 gathers data from the monitored system 120 and determines zero, one or more suggested tuning actions for the monitored system.

If there are no tuning actions suggested by the current tuning strategy, no further action with respect to the current tuning strategy is taken, and the pointer 130 advanced to the next tuning strategy of the list 116. If there is no tuning strategy following the current tuning strategy on the list 116, the pointer is instead moved to the first tuning strategy of the list 116.

If there is a suggested tuning action, the evaluation component 122 examines for each tuning action the database system state history 108, searching for past events where an opposite tuning action was done. If it is found that one of the tuning actions would be part of an oscillation with regard to past tuning actions, and the oscillations do not converge against a limit, in the list 116 of tuning strategies 104 one of the tuning strategies that were responsible for the oscillation is disabled in order to prevent it from being used in the future. The one of the tuning strategies can be disabled by removing it from the list or otherwise marking it as disabled. If more than one tuning strategy was responsible, the tuning strategy that was the last added to the list 116 is disabled. In this way, conflicts between mutually contradicting tuning strategies are resolved, giving precedence to those of the contradicting tuning strategies that have a longer history of reliable operation. If the tuning strategy disabled is the current strategy, the pointer is advanced to the next tuning strategy of the list 116.

If there is a suggested tuning action, the evaluation component 122 instructs the execution component 124 to execute the respective tuning action. The execution component 124 records each change to the database system in the database system state history 108.

The interpreter 110 continues to interpret the workflow language of the current tuning strategy, now passing instructions to the verification component 126. According to the instructions, after waiting a predetermined time interval to allow the change in the monitored database system 120 to make an impact, the verification component 126 measures the performance of the database system according to the tuning strategy. The verification component 126 compares the pre-action and the post-action database system performance to judge whether the performance of the database system has decreased. If the performance is judged to have decreased, the verification component 126 instructs the restoration component 128 to restore the previous database system state to the state before the tuning action's changes according to the current tuning strategy were applied, using the database system state history 108.

The pointer 130 is advanced to the next tuning strategy in the list 116, making it the current tuning strategy and continuing the method by tuning the monitored database system 120 according to the new current tuning strategy as described.

Preferably, the user interface 114 comprises a stopping element 134, a disclosure element 136, and a continuation element 138, allowing an administrator to manually control the tuning process. By operating the stopping element the administrator stops the automatic execution of the tuning process and enters a step-by-step mode. Through the disclosure element 136, details of the following step are disclosed, allowing the administrator to observe the actions taken by the current strategy. The administrator can acknowledge the following step by operating the continuation element 138, after which it is executed. Preferably, the disclosure element 136 furthermore allows the administrator to modify the following step before giving acknowledgment for execution. The user interface 114 can further support interactive design of new tuning strategies through a strategy editor interface 139, starting either from the ground up or from a duplicate of an existing tuning strategy. New tuning strategies can then be uploaded to the remote repository 112.

Figure 2:
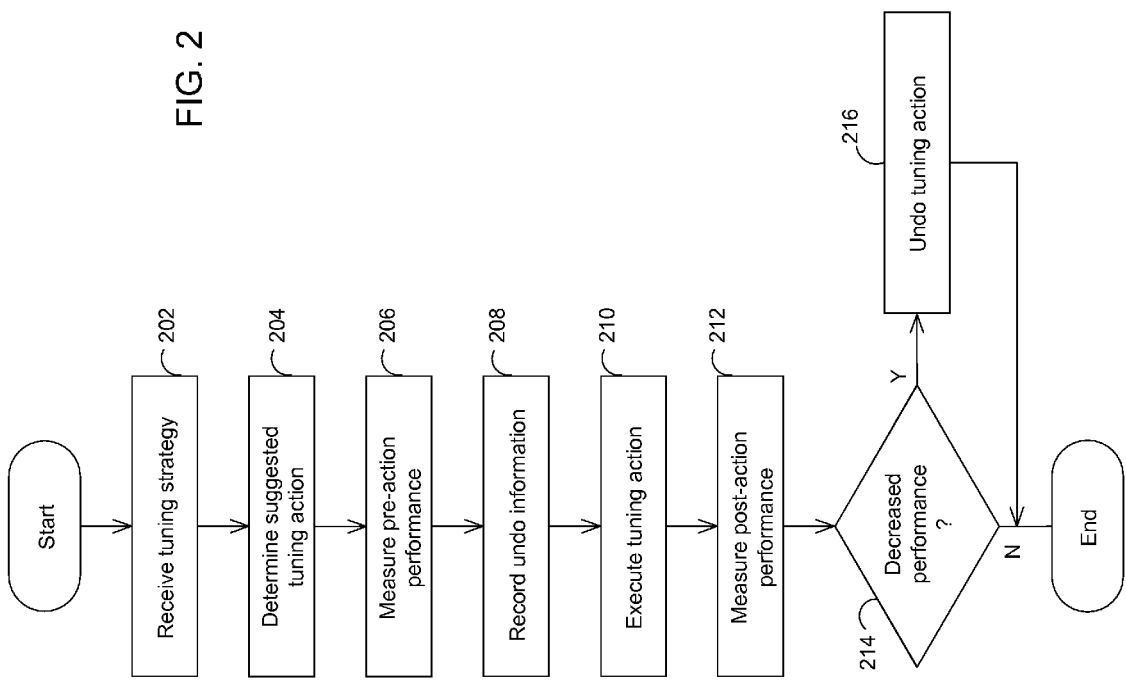
FIG. 2 is a flow chart of the method in accordance with one embodiment of the invention.

FIG. 2 is a flowchart of a method as provided by the invention for tuning a database system. In step 202, a tuning strategy is received. The tuning strategy comprises a first procedure that specifies how to determine a suggested tuning action for the database system, and a second procedure that specifies how to measure database system performance before and after the tuning action. The intended goal of the tuning strategy is to increase the performance of the database system, judged according to its own definition of a measure for performance.

In step 204, a suggested tuning action (for example setting a configuration parameter to a new value) is determined. In step 206, the current, pre-action performance of the database system is determined, according to the second procedure of the tuning strategy. In step 208, undo information that indicates how to undo the database system state change of the suggested tuning action (for example the current value of the same configuration parameter) is recorded in a database system state history. In step 210, the tuning action determined in step 204 is actually executed.

Further steps following step 210 serve to verify that the execution of the tuning action has had the intended effect of increasing the performance of the database system. In step 212 the new, post-action performance of the database system is measured and compared against the pre-action performance as measured in step 206. In decision step 214 it is judged whether the performance has decreased according to the second procedure of the tuning strategy. If the performance has decreased, the state change of the database system is undone in step 216 using the undo information as recorded in the database system state history. If the performance has not decreased, no action is taken.

Figure 3:
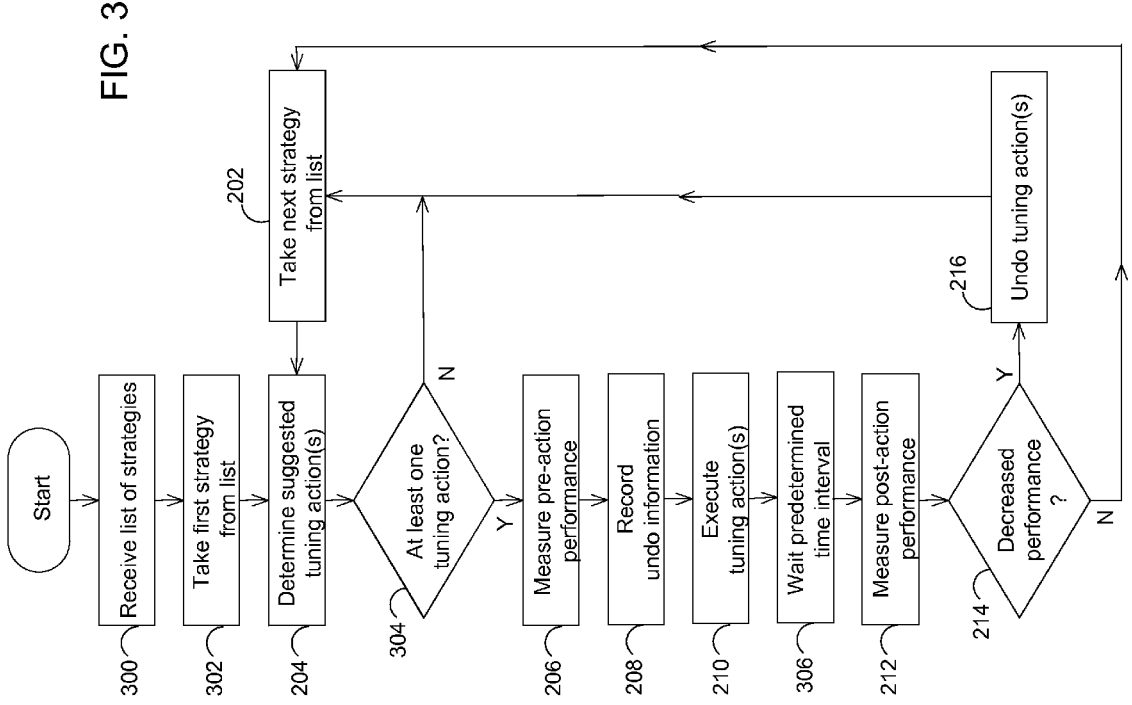
FIG. 3 is a flow chart of an embodiment of the method in accordance with one embodiment of the invention.

FIG. 3 is a flowchart of an embodiment of the method of the invention, serving to tune a database system. In step 300 a list of tuning strategies is received, each specifying how to tune the database system in a particular way. In step 302, the first tuning strategy is taken from the list. In step 204, zero, one or more suggested tuning actions are determined according to the current tuning strategy. In decision step 304, it is detected whether the current tuning strategy has suggested at least one tuning action. If there is no tuning action suggested, in step 202 the next tuning strategy is taken from the list and made the current tuning strategy.

If in decision step 304 it is detected that the current tuning strategy suggests one or more tuning actions, in step 206 the current, pre-action performance of the database system is measured. In step 208, the current state of the database system is recorded in a database system state history. In step 210, the one or more tuning actions determined in step 204 are executed.

In order to verify the success of the current tuning strategy, a time interval predetermined as defined by the current tuning strategy passes in step 306, during which the database system operates with the changes made by the one or more tuning actions determined in step 204 according to the current tuning strategy. After the time interval has passed, the post-action performance of the database system is measured in step 212. In decision step 214, the pre-action performance and the post-action performance of the database system are compared in order to judge whether the performance of the database system has decreased. If the performance is judged to have decreased, the previous state of the database system is in step 216 restored by undoing the database system state changes of the current strategy using the undo information recorded in the database state history. Optionally, the current tuning strategy is also disabled in the list of tuning strategies. Alternatively, a track record of past incidences where the same tuning strategy has lead to a decrease in performance of the database system is consulted, as provided for example by the database system state history. Only when such incidents have occurred a statistically significant number of times, the current tuning strategy is disabled, for example, by removing the current tuning strategy from the list.

In step 202, the next tuning strategy is taken from the list and made current tuning strategy. If in decision step 214 the performance is judged not to have decreased, the database system is left as is, and the method proceeds directly to step 202 where the next tuning strategy is taken from the list.

LIST OF REFERENCE NUMERALS

100 Database system
104 Tuning strategy
108 Database system state history
110 Interpreter
112 Remote repository
114 User interface
116 List of tuning strategies
118 Database performance tuning system
120 Monitored database system
122 Evaluation component
124 Execution component
126 Verification component
128 Restoration component
130 Pointer to current tuning strategy
132 Network interface
134 Stopping element
136 Disclosure element
138 Continuation element
139 Strategy editor interface
140 Notification tuning strategy
202 Receiving of tuning strategy
204 Determining of suggested tuning action
206 Measuring of pre-action performance of the database system
208 Recording of undo information
210 Executing of the tuning action
212 Measuring of post-action performance of the database system
214 Verification of performance increase
216 Restoration of previous state of database system
300 Receiving of list of tuning strategies
302 Taking of first tuning strategy from list
304 Detecting of suggested tuning actions
306 Waiting for predetermined time interval

The invention claimed is:

1. A method for tuning a database system, the method comprising:
receiving a tuning strategy from a logically remote repository of tuning strategies that is external to the database system, the tuning strategy comprising a first procedure to determine a suggested tuning action involving a database system state change, and a second procedure to measure database system performance,
determining the suggested tuning action according to the first procedure,
measuring pre-action database system performance according to the second procedure,
prior to executing the suggested tuning action, recording in a database system state history undo information that indicates how to undo the database system state change of the suggested tuning action,
executing the suggested tuning action,
measuring post-action database system performance according to the second procedure, and
when the post-action database system performance is lower than the pre-action database system performance, undoing the database system state change of the tuning action using the undo information from the database system state history.

2. The method of claim 1, wherein the database system state change is selected from the group consisting of:
modification of a database configuration parameter, creation of a database table index, and removal of a database table index.

3. The method of claim 1, wherein the first procedure comprises:
collecting query language statements processed by the database system, and
analyzing the statements for the determining of the suggested tuning action.

4. The method of claim 1, further comprising waiting for a predetermined time interval after executing the tuning action.

5. The method of claim 1, wherein a plurality of suggested tuning actions is determined according to the first procedure, each of the tuning actions involving a respective one of a plurality of database system state changes, wherein the undo information indicates how to undo each of the plurality of database system state changes, and wherein, when the post-action database system performance is lower than the pre-action database system performance, each of the plurality of database system state changes is undone using the undo information.

6. The method of claim 1, wherein the tuning strategy is stored in a data object, and the database system comprises an interpreter to interpret the data object.

7. The method of claim 1, wherein the database system comprises a user interface, the method further comprising:
stopping during one of the steps of the method as defined, disclosing the one of the steps via the user interface, and
when an acknowledgement of the one of the steps is received via the user interface, continuing execution of the one of the steps.

8. The method of claim 7, further comprising modifying the one of the steps via the user interface before continuing execution.

9. The method of claim 1, further comprising:
receiving a list of tuning strategies, and
repeating the method as defined for each tuning strategy of the list.

10. The method of claim 9, further comprising disabling one of the tuning strategies of the list when the post-action database system performance is lower than the pre-action database system performance.

11. The method of claim 9, further comprising:
determining whether or not there is a suggested tuning action according to the first procedure, and
proceeding to the next tuning strategy from the list when there is no suggested tuning action.

12. The method of claim 9, further comprising:
analyzing the database system state history for a non-converging oscillation of an oscillating database system state, and
when a non-converging oscillation is detected, disabling one of the tuning strategies of the list according to which the oscillating database system state was changed during the oscillation.

13. A computer program product for tuning a database system, the computer program product comprising;
a non-transitory computer usable storage medium having computer usable program code embodied therewith, the computer usable program code comprising:
computer usable program code configured to receive a tuning strategy from a logically remote repository of tuning strategies that is external to the database system, the tuning strategy comprising a first procedure to determine a suggested tuning action involving a database system state change, and a second procedure to measure database system performance,
computer usable program code configured to determine the suggested tuning action according to the first procedure,
computer usable program code configured to measure pre-action database system performance according to the second procedure,
computer usable program code configured to record in a database, prior to executing the suggested tuning action, system state history undo information that indicates how to undo the database system state change of the suggested tuning action,
computer usable program code configured to execute the suggested tuning action,
computer usable program code configured to measure post-action database system performance according to the second procedure, and
computer usable program code configured to undo the database system state change of the tuning action using the undo information from the database system state history when the post-action database system performance is lower than the pre-action database system performance.

14. A database performance tuning system for tuning a monitored database system, the database performance tuning system comprising:
a tuning strategy, received from a logically remote repository of tuning strategies that is external to the database system, the tuning strategy comprising a first procedure to determine a suggested tuning action involving a monitored database system state change, and a second procedure to measure performance of the monitored database system,
an evaluation component for determining the suggested tuning action according to the first procedure, and measuring pre-action performance of the monitored database system according to the second procedure,
a database system state history for storing undo information that indicates how to undo the monitored database system state change, prior to executing the suggested tuning action,
an execution component for executing the suggested tuning action,
a verification component for measuring post-action performance of the monitored database system according to the second procedure, and
a restoration component for undoing the monitored database system state change using the undo information from the database system state history when the post-action performance is lower than the pre-action performance.

* * * * *

UNITED STATES PATENT AND TRADEMARK OFFICE
CERTIFICATE OF CORRECTION

| | | |
|---|---|---|
| PATENT NO. | : 8,180,762 B2 | Page 1 of 1 |
| APPLICATION NO. | : 11/467065 | |
| DATED | : May 15, 2012 | |
| INVENTOR(S) | : Torsten Steinback et al. | |

It is certified that error appears in the above-identified patent and that said Letters Patent is hereby corrected as shown below:

Title Page, item (12) and (75);

The first name of inventor "Thorsten Steinbach" is misspelled on the issued patent.

The correct spelling should be: Torsten Steinback.

Signed and Sealed this
Twenty-eighth Day of August, 2012

David J. Kappos
*Director of the United States Patent and Trademark Office*